(12) United States Patent
Tawara

(10) Patent No.: US 11,490,647 B2
(45) Date of Patent: Nov. 8, 2022

(54) SANDWICH MAKER FOR MAKING CRUSTLESS SEALED SANDWICH

(71) Applicant: Kei Tawara, Lancaster, PA (US)

(72) Inventor: Kei Tawara, Lancaster, PA (US)

(*) Notice: Subject to any disclaimer, the term of this patent is extended or adjusted under 35 U.S.C. 154(b) by 531 days.

(21) Appl. No.: 16/746,689

(22) Filed: Jan. 17, 2020

(65) Prior Publication Data

US 2021/0137151 A1 May 13, 2021

Related U.S. Application Data

(60) Provisional application No. 62/934,101, filed on Nov. 12, 2019.

(51) Int. Cl.
*A23P 20/20* (2016.01)
*A21C 15/04* (2006.01)
*A47J 33/00* (2006.01)
*B26D 1/01* (2006.01)

(52) U.S. Cl.
CPC .............. *A23P 20/20* (2016.08); *A21C 15/04* (2013.01); *A47J 33/00* (2013.01); *B26D 1/01* (2013.01); *B26D 2210/02* (2013.01)

(58) Field of Classification Search
CPC .......... A23P 20/20; A21C 15/02; A47J 33/00; B26D 2210/02
See application file for complete search history.

(56) References Cited

U.S. PATENT DOCUMENTS

| | | | |
|---|---|---|---|
| 6,004,596 A | 12/1999 | Kretchman et al. | |
| 6,754,965 B1* | 6/2004 | Kretchman | B65D 25/20 30/316 |
| 11,412,742 B2* | 8/2022 | Franklin | A21C 9/068 |
| 2008/0241326 A1 | 10/2008 | Ekberg | |
| 2015/0291309 A1* | 10/2015 | McGregor | B65D 21/086 220/573.1 |
| 2021/0137317 A1* | 5/2021 | Tawara | A23P 30/10 |

* cited by examiner

*Primary Examiner* — Omar Flores Sanchez

(57) ABSTRACT

An objective of the present invention is to provide users with an apparatus, that can cut and seal a sandwich in multiple shapes. It is an aim of the present invention to provide a sandwich maker that comprises a semi-transparent or transparent material, which enables users to see and monitor the sandwich, as the crusts of the bread are being cut and the sandwich sealed. Further, the present invention comprises multiple pieces and shapes that serve specific purposes, the functions of which may be performed mutually exclusively. Furthermore, the sealing piece of the present invention has an oblique inner surface, that compresses the upper piece of the sandwich compactly, without creating any cracks or spillage of the filling. Thus, the present invention enables users to have a perfectly sealed, spill proof, and aesthetically appealing sandwich with a slight dome shape.

10 Claims, 8 Drawing Sheets

SANDWICH MAKER FOR MAKING CRUSTLESS SEALED SANDWICH

The current application claims a priority to the U.S. Provisional Patent application Ser. No. 62/934,101 filed on Nov. 12, 2019.

FIELD OF THE INVENTION

The present invention relates generally to a sandwich maker. More specifically, the present invention is an apparatus for making sealed crustless sandwiches.

BACKGROUND OF THE INVENTION

Many people, especially kids prefer and enjoy a crustless sealed sandwich over a regular sandwich. A sealed crustless sandwich is a foodstuff comprising a filling sealed between two layers of bread by a crimped edge, with the crust subsequently removed. Most sandwich makers available in the market often do not form a good seal, and/or form cracks on the surface of the bread upon sealing. This leads to spill out of the filling through the sandwich or an aesthetically imperfect looking sandwich. Also, a sandwich maker which can seal and cut the sandwich in multiple shapes is a rare find in the current market.

An objective of the present invention is to provide users with an apparatus, that can cut and seal a sandwich in multiple shapes. It is an aim of the present invention to provide a sandwich maker that comprises a semi-transparent or transparent material, which enables users to see and monitor the sandwich, as the crusts of the bread are being cut and the sandwich sealed. Further, the present invention comprises multiple pieces and shapes that serve specific purposes. More specifically, the present invention gives users the option to just cut the crusts off of the bread, or cut materials for the filling (such as cheese, meat, vegetables etc.), or just seal the sandwich, mutually exclusively with the different pieces of the present invention. Furthermore, the sealing piece of the present invention has a specific curved inner surface, that compresses the upper piece of the sandwich compactly, without creating any cracks or spillage of the filling. This curved inner surface also gives a slightly bulged shape for the upper piece of the sandwich. Thus, the present invention enables users to have a perfectly sealed, spill proof, and aesthetically appealing sandwich with a slight dome shape.

DETAIL DESCRIPTIONS OF THE INVENTION

All illustrations of the drawings are for the purpose of describing selected versions of the present invention and are not intended to limit the scope of the present invention.

In reference to FIG. 1 through FIG. 8, the present invention is a sandwich maker. An objective of the sandwich maker is to provide users with an apparatus, that can cut and seal a sandwich in multiple shapes. It is an aim of the present invention to provide a sandwich maker that comprises a semi-transparent or transparent material, which enables users to see and monitor the sandwich, as the crusts of the bread are being cut and the sandwich sealed. Further, the sandwich maker comprises multiple pieces and shapes that serve specific purposes. More specifically, the sandwich maker gives users the option to just cut the crusts off of the bread, or cut materials for the filling (such as cheese, meat, vegetables etc.), or just seal the sandwich, mutually exclusively with the different pieces of the present invention. Furthermore, the sealing piece of the sandwich maker has a specific curved/oblique inner surface, that compresses the upper piece of the sandwich compactly, without creating any cracks or spillage of the filling. This curved/oblique inner surface also gives a slightly bulged shape for the upper piece of the sandwich. Thus, the sandwich maker enables users to have a perfectly sealed, spill proof, and aesthetically appealing sandwich with a slight dome shape.

Figure 1:
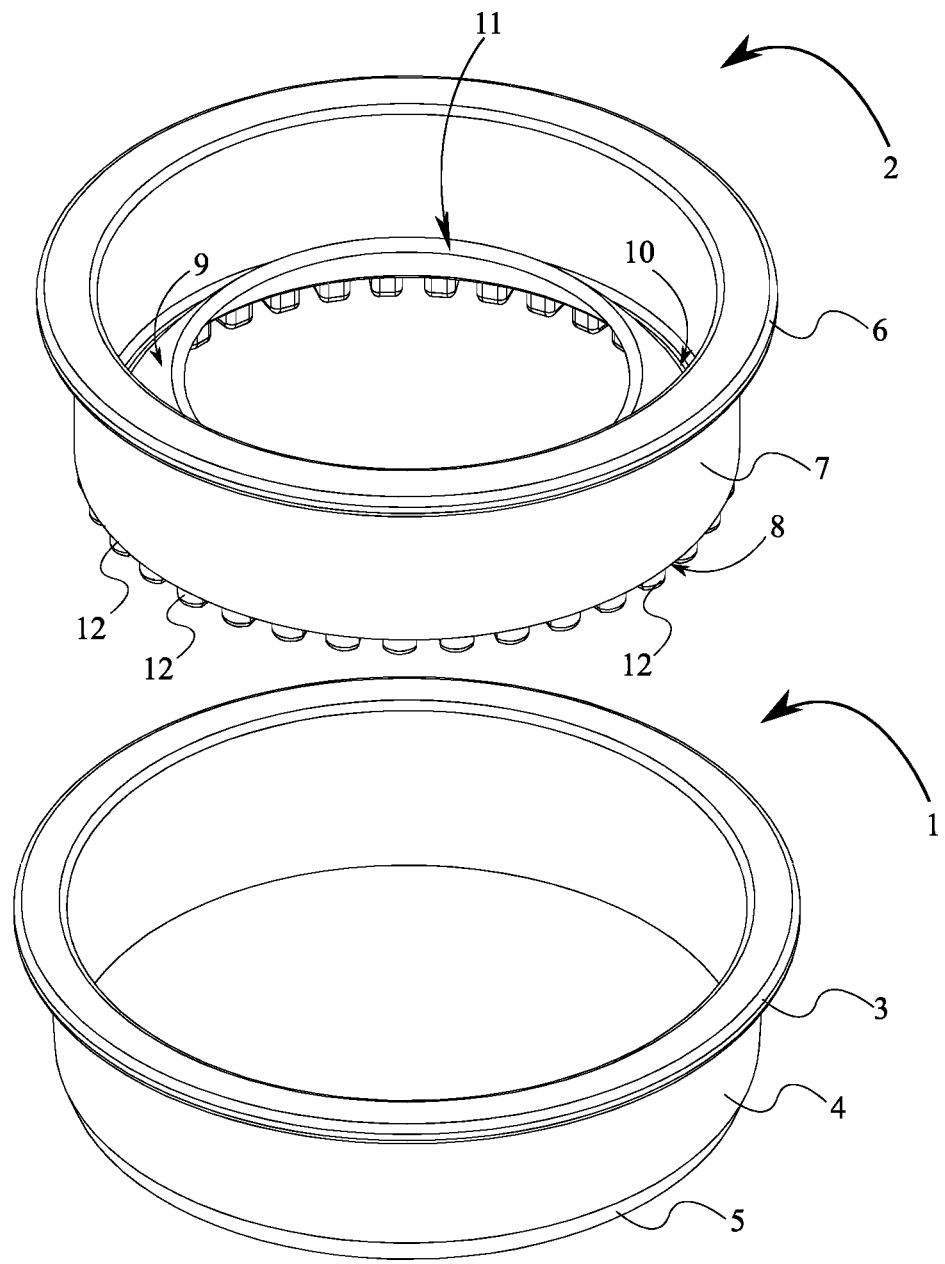
FIG. 1 is a top-front perspective view of the present invention in an exploded configuration.
Figure 2:
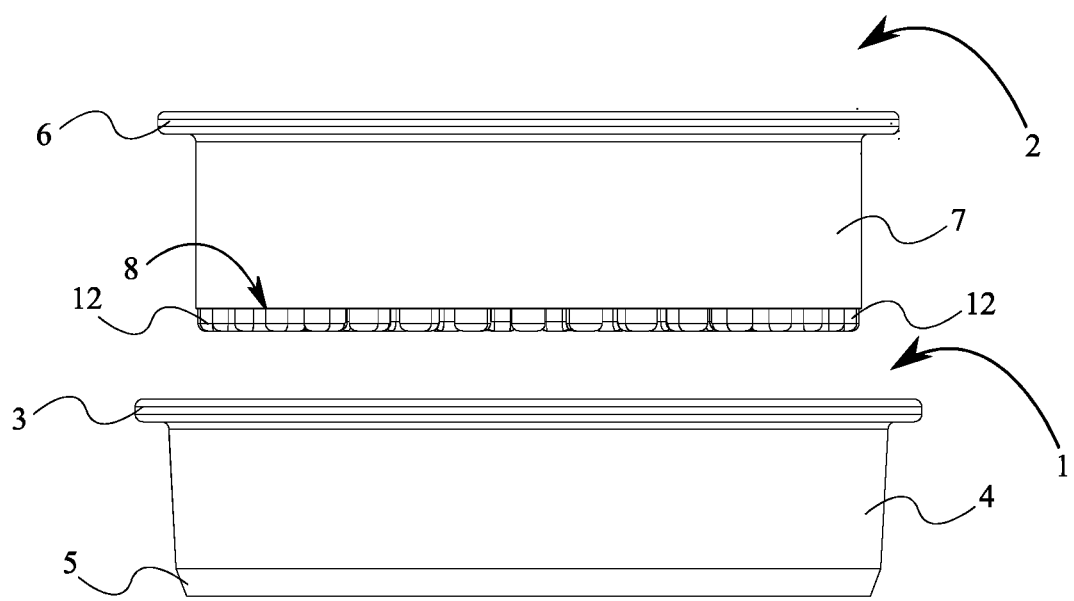
FIG. 2 is a left perspective view of the present invention in an exploded configuration.
Figure 3:
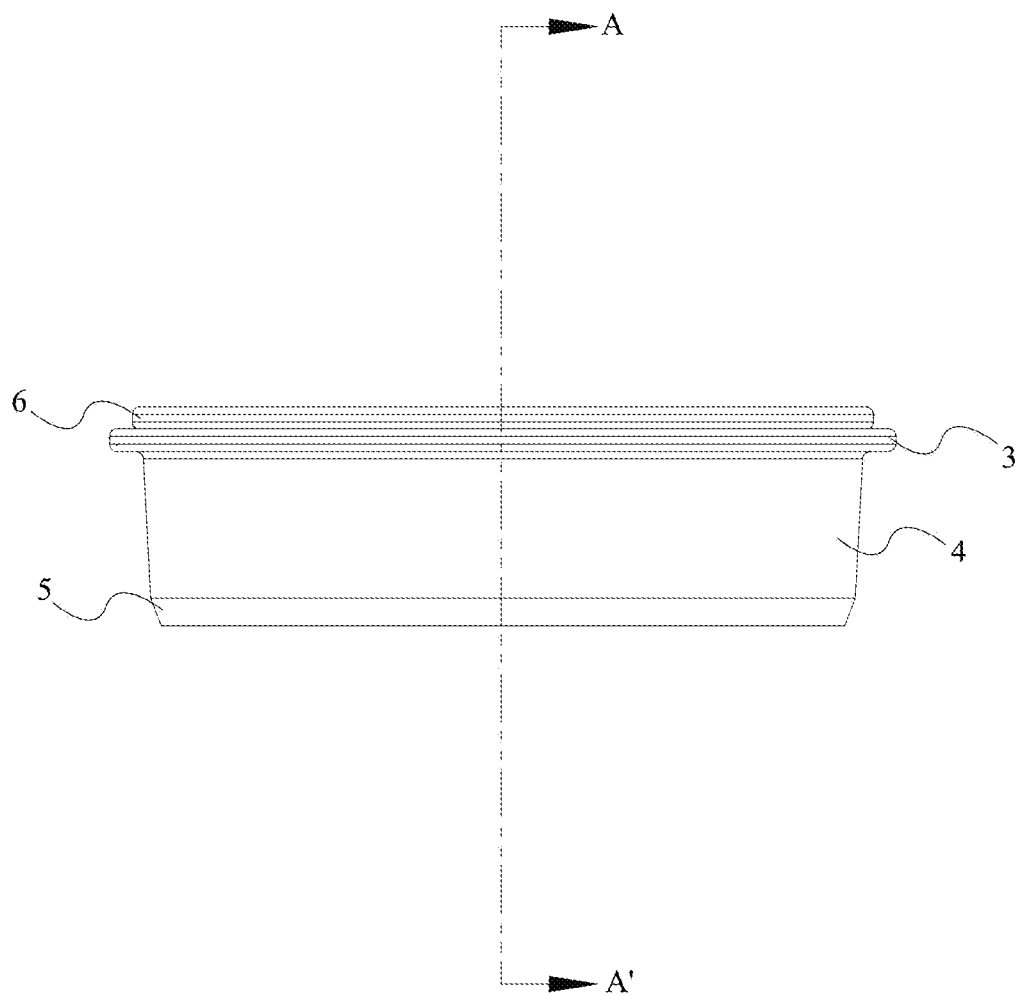
FIG. 3 is a front perspective view of the present invention in a nested configuration.
Figure 4:
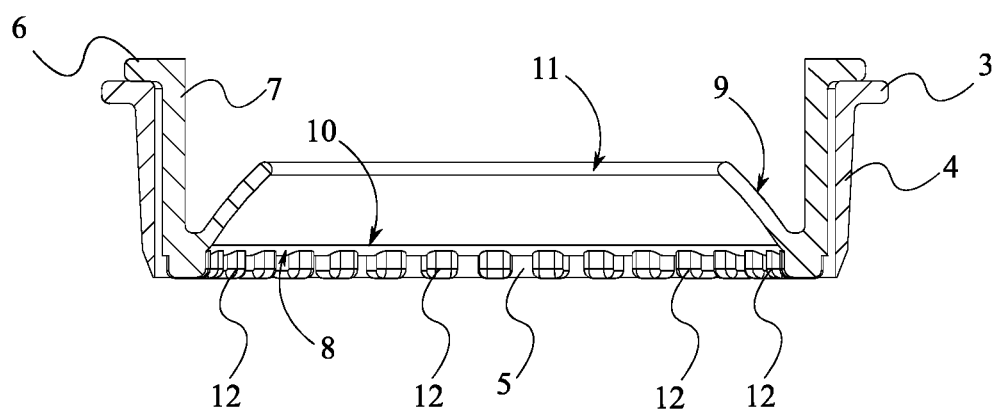
FIG. 4 is a sectional view along A-A' of FIG. 3.

The following description is in reference to FIG. 1 through FIG. 8. As seen in FIG. 1, the sandwich maker comprises a primary cutting die 1 and a sealing press 2. The primary cutting die 1 and the sealing press 2 can comprise any shape, size, material, features, type or kind, quantity, components, and arrangements of components that would allow the present invention to fulfill the objectives and intents of the present invention. However, in the preferred embodiment of the present invention, the primary cutting die 1 is circular in shape and comprises a first rim 3, a first lateral sidewall 4, and an at least one primary blade 5. According to the present invention, the first lateral sidewall 4 is connected in between the first rim 3 and the at least one primary blade 5. Preferably, the first rim 3 is thicker and wider than the primary blade 5, such that the first rim 3 provides a good grip or hold for the user, and the user may conveniently hold the first rim 3 within the user's hand and press the primary blade 5 over a piece of bread, to have the piece of bread cut in the shape of the primary blade 5. Further, the first lateral sidewall 4 is positioned coextensive to the primary blade 5, such that the lower portion of the lateral sidewall 4 along with the primary blade 5, forms a smooth cut on the bread, without any imperfections along the perimeter of the cut piece of bread. According to the present invention, the primary cutting die 1 is intended to cut the sides or crusts off of a piece of bread. However, the primary cutting die 1 may be used for cutting any material, such as cookie dough, pastry, playdough etc. that may be cut with the sharpness of the primary blade 5.

According to the preferred embodiment of the present invention, the sealing press 2 is intended to seal two pieces of bread with a filling inside, to make a sandwich. Continuing with the preferred embodiment of the present invention, the sealing press 2 comprises a second rim 6, a second lateral sidewall 7, a sealing edge 8, and an oblique surface 9. Preferably, the second rim 6 constitutes the upper surface of the sealing press 2 and the sealing edge 8 constitutes the lower surface of the sealing press 2. Further, the second rim 6 is wider and thicker than the sealing edge 8, such that the second rim 6 provides a good grip or hold for the user.

Accordingly, the user may conveniently hold the second rim 6 within the user's hand and press the sealing edge 8 over two pieces of bread (preferably with a filling between the two pieces of bread), to form a well-sealed sandwich. The second lateral sidewall 7 is connected between the second rim 6 and the sealing edge 8, and the second lateral sidewall 7 is positioned coextensive to the sealing edge 8. As a result, the second lateral sidewall 7 forms the seamless connection between the second rim 6 and the sealing edge 8. Furthermore, the oblique surface 9 comprises a first edge 10 and a second edge 11, wherein the first edge 10 constitutes a lower end of the oblique surface 9 and the second edge 11 constitutes an upper end of the oblique surface 9. According to the preferred embodiment, the first edge 10 is perimetrically connected to the sealing edge 8, the second edge 11 is positioned in between the sealing edge 8 and the second rim 6, and the oblique surface 9 tapers from the first edge 10 to the second edge 11. This arrangement of the oblique surface 9 on the sealing press 2, enables the present invention to compress the sandwich compactly without creating any cracks or spillage of the filling. Further, the oblique surface 9 also gives a slightly bulged shape for the upper surface of the sandwich. Furthermore, the sandwich maker comprises a plurality of protrusions 12, that is connected adjacent to the sealing press 2. According to the present invention, the plurality of protrusions 12 is distributed along the sealing edge 8, such that, when the sandwich is sealed by pressing the sealing press 2 on two pieces of bread, the plurality of protrusions 12 helps create a better seal and an imprint on the edges of the two pieces of bread. The imprint/design on the edges of the bread will depend on the size and shape of the plurality of protrusions 12. Preferably, the plurality of protrusions 12 comprises rectangle pieces with rounded edges, that span a couple of centimeters in length. However, the plurality of protrusions 12 may comprise any other shape, size or design, as long as the intended purpose of the present invention is not hindered.

As seen in FIG. 1 through FIG. 4, the dimensions of the primary cutting die 1 and the sealing press 2 are such that, the sealing press 2 may be nested within the primary cutting die 1. According to the present invention, during the nested configuration, the second rim 6 is pressed against the first rim 3. This enables the user to stack and store the present invention in a compact fashion, when not in use.

In the preferred embodiment of the present invention, it is also preferred that, the primary cutting die 1 and the sealing press 2 comprise transparent or semi-transparent materials such that, the user may observe the cutting and sealing of the different pieces of the sandwich, as the sandwich is being made. Such materials include, but are not limited to clear food grade plastics, hard silicone, semitransparent plastics etc. Furthermore, it is an aim of the sandwich maker to provide users with the option of making crustless sealed sandwiches in three different shapes. Accordingly, the present invention comes in square, circular and/or triangular shapes for the primary cutting die 1 and the sealing press 2. However, any other material, shape or color may be employed for the primary cutting die 1 and the sealing press 2, as long as the intended purpose of the present invention is not altered.

Figure 5:
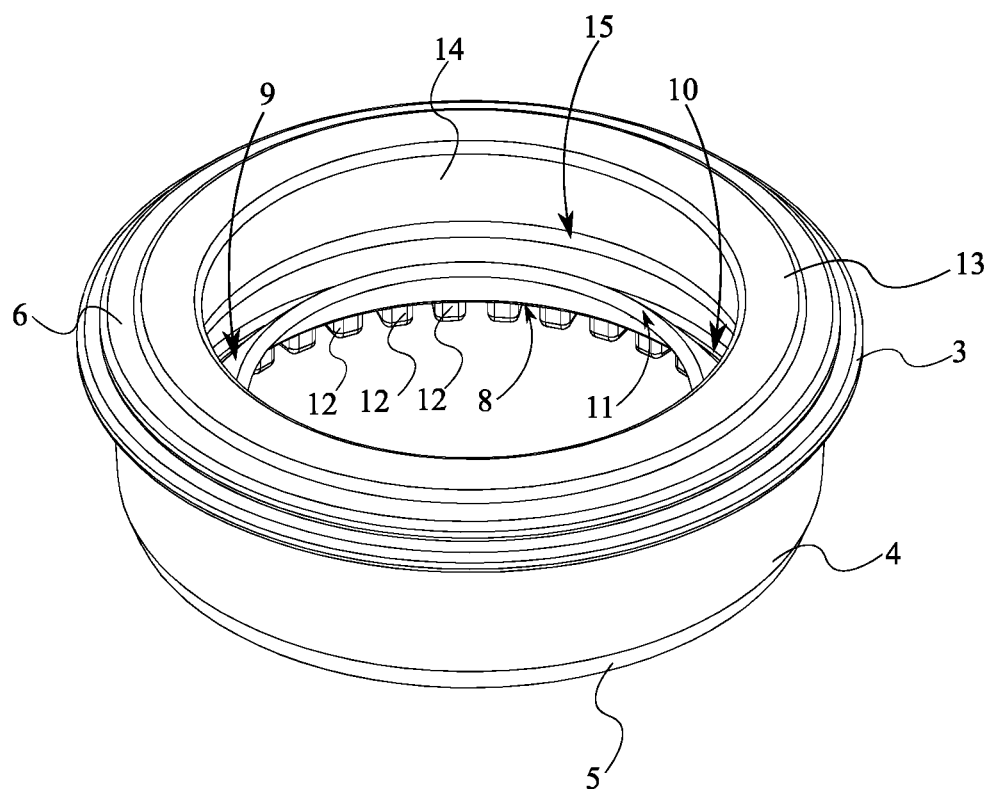
FIG. 5 is a top-front perspective view of the present invention in a nested configuration.
Figure 6:
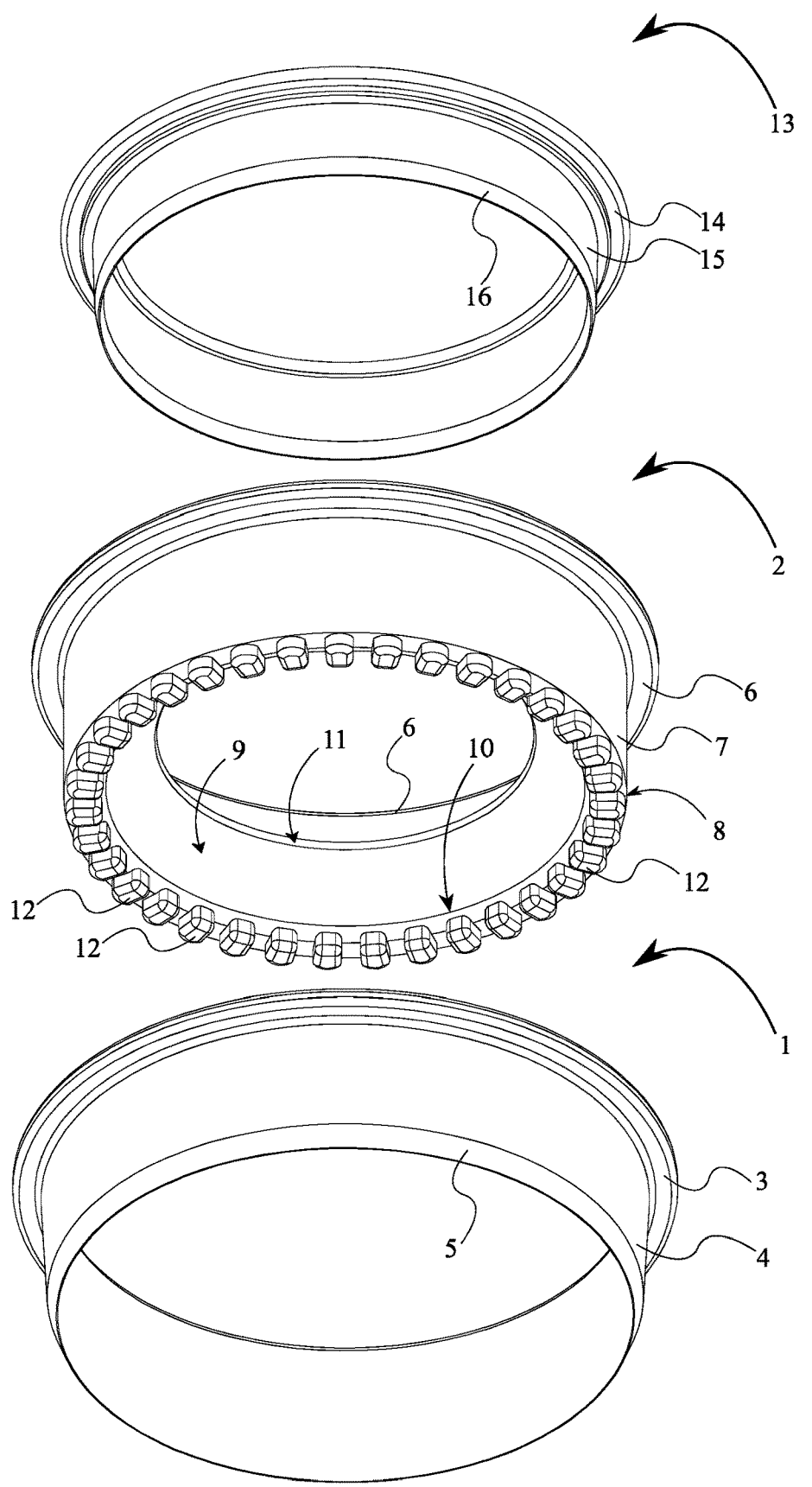
FIG. 6 is a bottom-rear perspective view of the present invention, in an exploded configuration.

According to the present invention, the sandwich maker may comprise a secondary cutting die 13. In the preferred embodiment of the present invention, the secondary cutting die 13 is an optional component that enables the user to cut materials for the filling, such as cheese, meat, vegetables etc. in such a way that the fillings fit perfectly within the dimensions of the sandwich. As seen in FIG. 5 and FIG. 6, the secondary cutting die 13 comprises a third rim 14, a third lateral sidewall 15, and at least one secondary blade 16, wherein the third lateral sidewall 15 is connected in between the third rim 14 and the at least one secondary blade 16. Preferably, the third rim 14 is thicker and wider than the secondary blade 16, such that the third rim 14 provides a good grip or hold for the user, and the user may conveniently hold the third rim 14 within the user's hand and press the secondary blade 16 over a piece of filling material, to have the filling material cut in the shape of the secondary blade 16. Further, a transversal cross-section of the secondary cutting die 13 corresponds to a transversal cross-section of the sealing press 2. This enables to have the cut filling material fit within the dimensions of the sealed sandwich and prevent overfilling/spilling of the filling. According to the present invention, the secondary cutting die 13 has dimensions such that, the secondary cutting die 13 may be nested within the sealing press 2. As seen in FIG. 5, the primary cutting die 1, the sealing press 2, and the secondary cutting die 13 may be stacked in an overlapping and compact fashion, when not in use.

Figure 7:
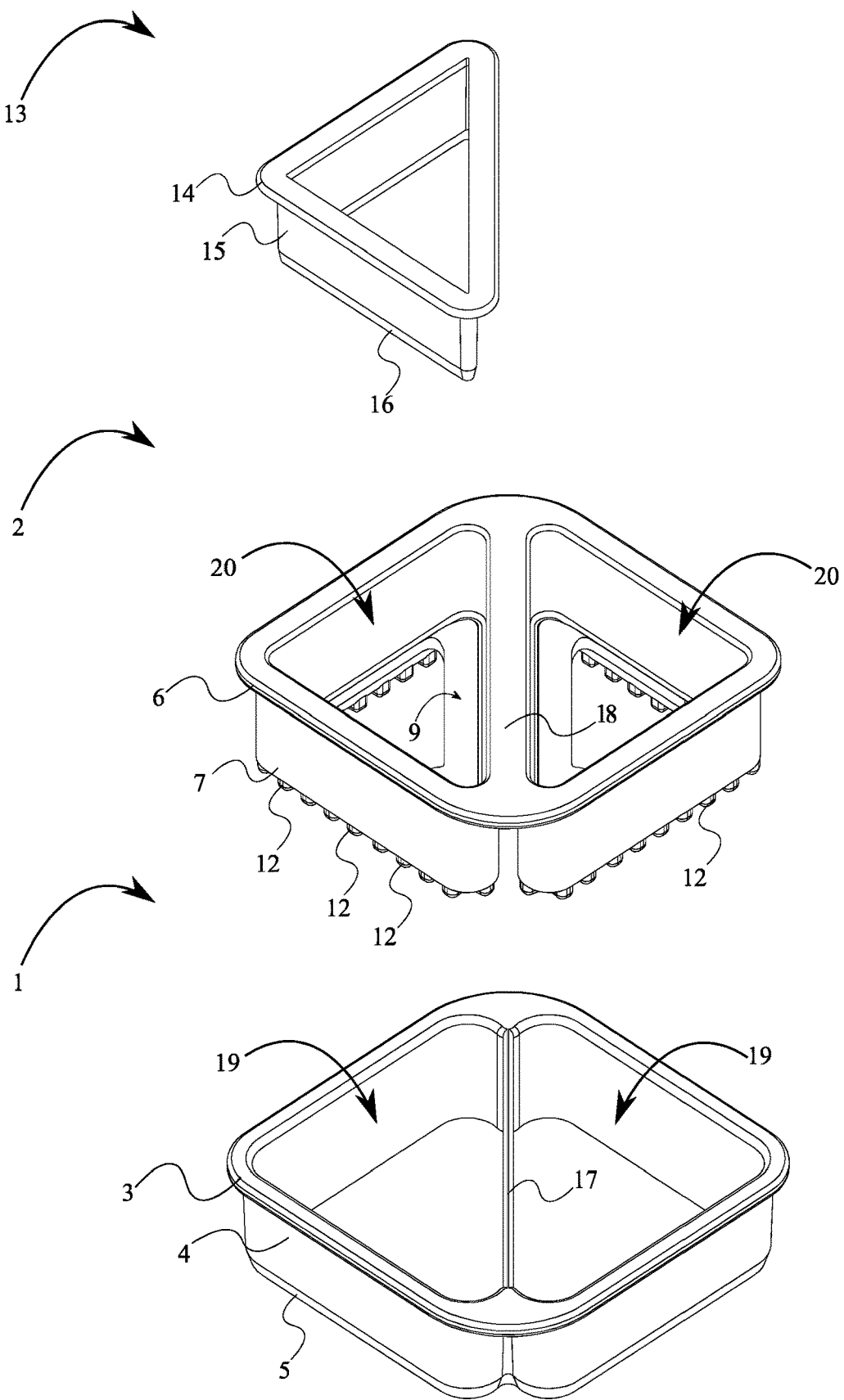
FIG. 7 is a top-front perspective view of an alternate shape of the present invention, in an exploded configuration.
Figure 8:
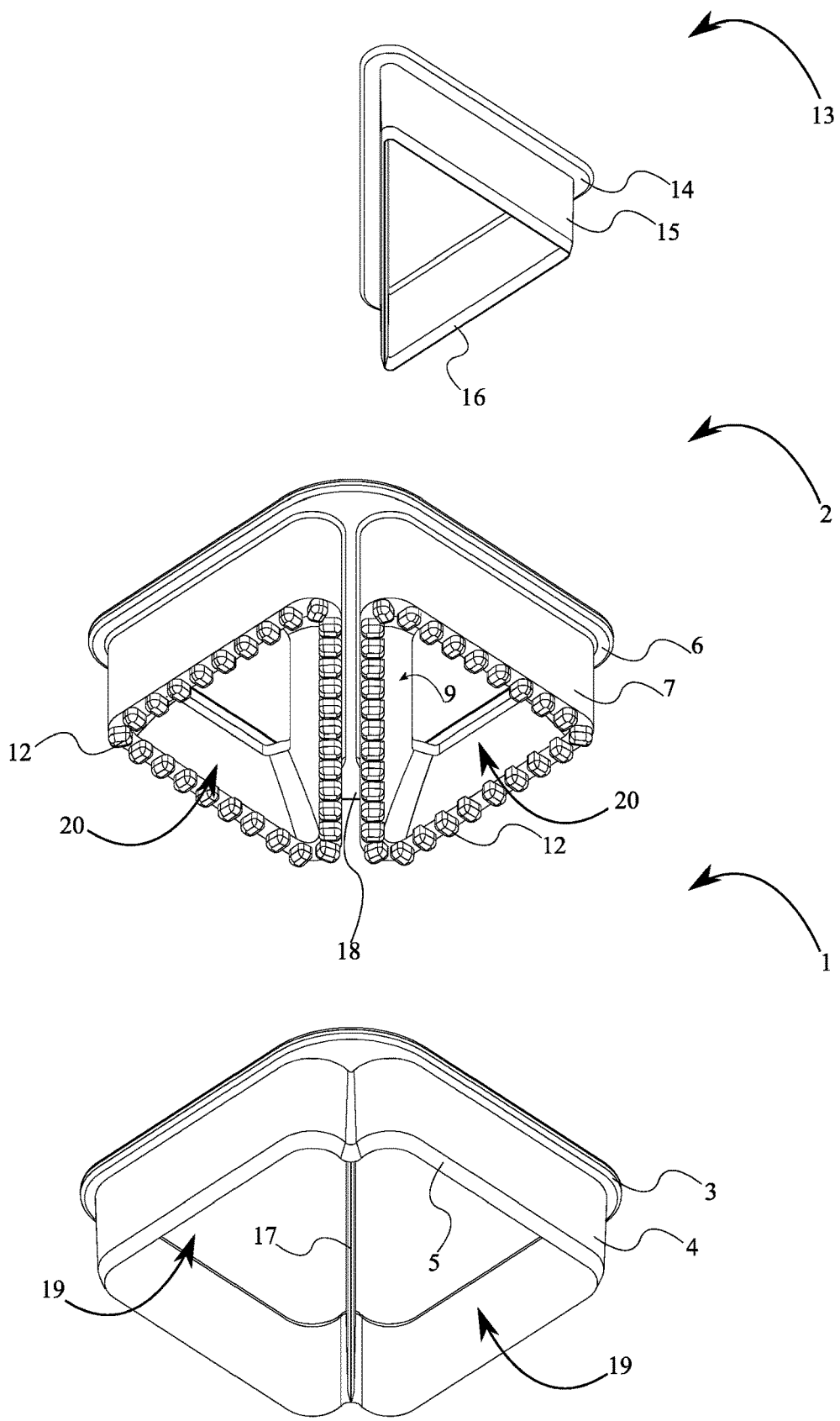
FIG. 8 is a bottom-rear perspective view of an alternate shape of the present invention, in an exploded configuration.

It is an aim of the present invention to provide users with the option of making crustless sealed sandwiches in different shapes. Accordingly, as seen in FIG. 7 and FIG. 8, the present invention comprises an alternate shaped primary cutting die 1, sealing press 2 and secondary cutting die 13. In this shape, the present invention comprises at least one partition blade 17 and a bridge 18. According to the preferred embodiment, the partition blade 17 normally traverses through the primary cutting die 1, and the partition blade 17 is mounted within the first lateral sidewall 4, wherein the partition blade delineates a plurality of compartments 19 within the primary cutting die 1. This arrangement enables the user to cut the bread into multiple pieces as the number of the compartments within the plurality of compartments 19. Further, in such arrangements, the at least one sealing press 2 is divided into a plurality of presses 20, wherein the bridge 18 is connected in between each of the plurality of presses 20. Furthermore, each of the plurality of presses 20 is positioned offset from each other, across the bridge 18, such that when the sealing press 2 is pressed to create a sandwich, sealing press 2 creates as many little sandwiches as the number of presses in the plurality of presses 20. Continuing with the preferred embodiment, an arbitrary press from the plurality of presses 20 engages into a corresponding compartment from the plurality of compartments 19, for easy sealing of smaller sandwiches. Further, the bridge 18 conformally overlaps the partition blade 17 in such a way that, the primary cutting die 1 and the sealing press 2 may still be nested in a compact fashion. Furthermore, in the preferred embodiment, a transversal cross-section of the secondary cutting die 13 corresponds to a transversal cross-section of the corresponding compartment from the plurality of compartments 19. This correspondence makes sure the filling materials cut by the secondary cutting die 13 aligns and fits within the bread pieces made by the primary cutting die 1, which further enables forming a spill proof sandwich. Furthermore, this correspondence and alignment also helps in nesting the secondary cutting die 1 within the sealing press 2 when not in use.

It is an aim of the sandwich maker, to provide users with different components that serve specific purposes. More specifically, the sandwich maker gives users the option to just cut the crusts off of the bread, or cut materials for the filling (such as cheese, meat, vegetables etc.), or just seal the sandwich, mutually exclusively, with the various components of the present invention.

A preferred method of making a crustless sealed sandwich with the present invention comprises the following steps: Cut the crusts off of a first piece of bread and a second piece of bread using the primary cutting die 1. Following that, place a filling over the first piece of bread, followed by placing of the second piece of bread over the filling, symmetrically aligned to the first piece of bread. Subsequently, press the sealing press 2 at the edges of the first piece of bread and the second piece of bread, thereby sealing the edges of the first piece of bread and the second piece of bread with the filling inside, to form the sandwich. According to the preferred embodiment, the sealing process leads to formation of a specific pattern along the edges of the sandwich, based on the plurality of protrusions 12 along the sealing edge 8 of the sealing press 2. Furthermore, the oblique surface 9 on the sealing press 9 enables to keep a dome shape to the sandwich without creating cracks or spillage on the sandwich. During the sealing process, the oblique surface 9 specifically allows the filling to spread uniformly along the sandwich, while providing the right amount of force from the upper rim surface of the sandwich. According to the preferred embodiment, the secondary die 13 may be used for cutting of filling materials for the sandwich. Preferably, the secondary die 13 cuts the filling materials to fit within the transversal cross section of, one of the compartments, within the plurality of compartments 19 of the primary cutting die 1. Accordingly, the cut filler materials are placed between the first piece of bread and the second piece of bread, before the sealing process. Further, the transparency of the primary cutting die 1, the sealing press 2 and the secondary cutting die 13 enables the user to properly monitor each guide each of the processes in precision.

Thus, the sandwich maker enables users to have a perfectly sealed, spill proof and aesthetically appealing sandwich with a slight dome shape on an upper surface of the sandwich.

Although the invention has been explained in relation to its preferred embodiment, it is to be understood that many other possible modifications and variations can be made without departing from the spirit and scope of the invention as hereinafter claimed.

What is claimed is:

1. A sandwich maker comprising:
a primary cutting die;
at least one sealing press;
the primary cutting die comprising a first rim, a first lateral sidewall, and at least one primary blade;
the at least one sealing press comprising a second rim, a second lateral sidewall, a sealing edge, and an oblique surface;
the first lateral sidewall being connected in between the first rim and the at least one primary blade;
the first lateral sidewall being positioned coextensive to the at least one primary blade;
the second lateral sidewall being connected in between the second rim and the sealing edge;
the second lateral sidewall being positioned coextensive to the sealing edge;
a first edge of the oblique surface being perimetrically connected to the sealing edge;
a second edge of the oblique surface being positioned in between the sealing edge and the second rim; and
the oblique surface tapering from the first edge to the second edge.

2. The sandwich maker of claim 1 comprising:
a plurality of protrusions;
the plurality of protrusions being connected adjacent to the at least one sealing press; and
the plurality of protrusions being distributed along the sealing edge.

3. The sandwich maker of claim 1, wherein the at least one sealing press is nested within the primary cutting die.

4. The sandwich maker of claim 3, wherein the second rim being pressed against the first rim.

5. The sandwich maker of claim 1, wherein the primary cutting die and the at least one sealing press are transparent.

6. The sandwich maker of claim 1, wherein the primary cutting die and the at least one sealing press are squares in shape.

7. The sandwich maker of claim 1, wherein the primary cutting die and the at least one sealing press are circular in shape.

8. The sandwich maker of claim 1, comprising:
a secondary cutting die;
the secondary cutting die comprising a third rim, a third lateral sidewall, and at least one secondary blade;
the third lateral sidewall being connected in between the third rim and the at least one secondary blade; and
a transversal cross-section of the secondary cutting die corresponding to a transversal cross-section of the at least one sealing press.

9. The sandwich maker of claim 1, comprising:
at least one partition blade;
a bridge;
the at least one sealing press being a plurality of presses;
the partition blade normally traversing the primary cutting die;
the partition blade being mounted within the first lateral sidewall;
the partition blade delineating a plurality of compartments within the primary cutting die;
the bridge being connected in between each of the plurality of presses;
each of the plurality of presses being positioned offset from each other, across the bridge; and
an arbitrary press from the plurality of presses engaging into a corresponding compartment from the plurality of compartments.

10. The sandwich maker of claim 8, comprising:
a secondary cutting die; and
a transversal cross-section of the secondary cutting die corresponding to a transversal cross-section of the corresponding compartment from the plurality of compartments.

* * * * *